3,145,076
OXIDATION OF SUBSTANCES SUSPENDED OR DISSOLVED IN A LIQUID RESISTANT TO OXIDATION
Martin Reichert, Frankenthal, Pfalz, and Leo Unterstenhoefer, Limburgerhof, Pfalz, Germany, assignors to Badische Anilin- & Soda-Fabrik Aktiengesellschaft, Ludwigshafen (Rhine), Germany
Continuation of application Ser. No. 149,719, Nov. 2, 1961. This application Aug. 7, 1963, Ser. No. 303,713
Claims priority, application Germany Nov. 4, 1960
4 Claims. (Cl. 23—1)

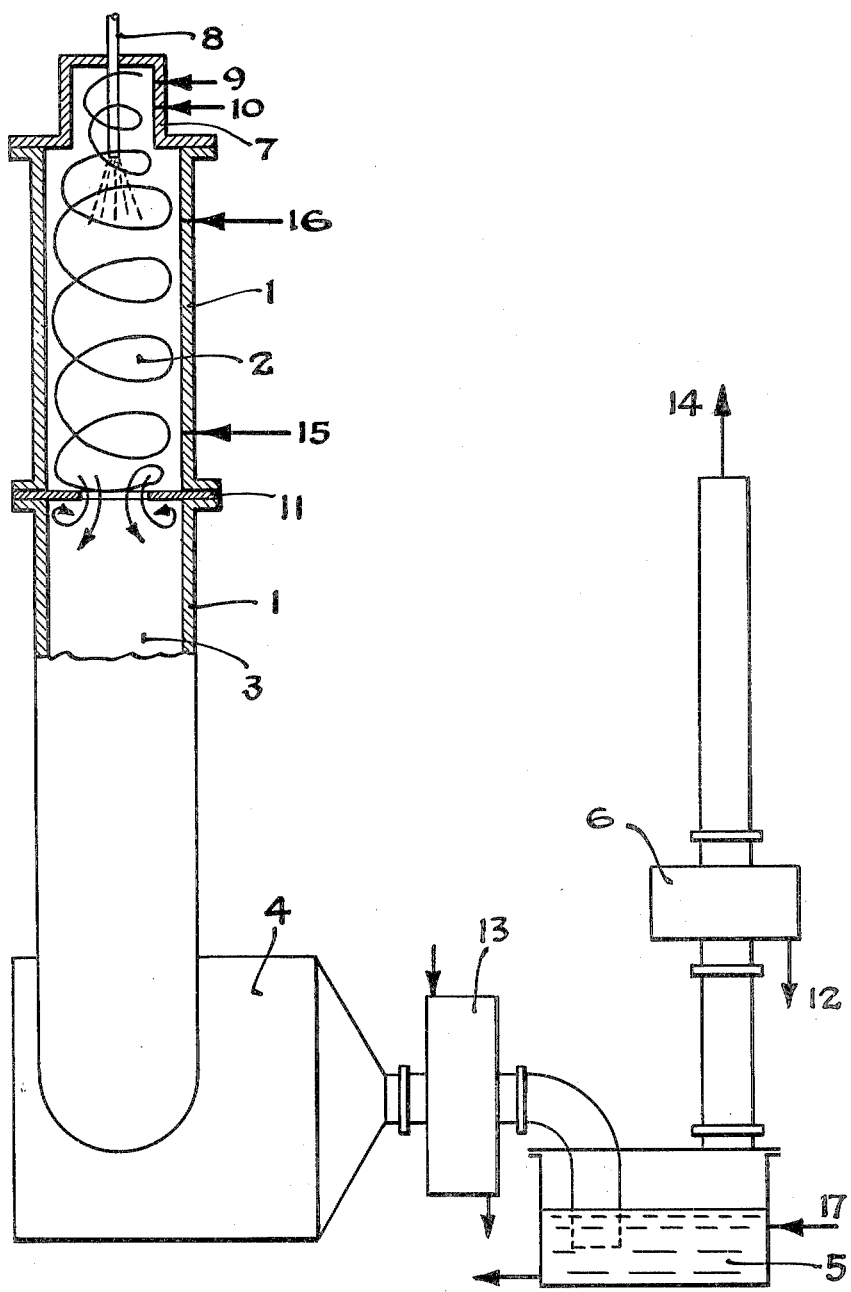

This invention relates to a process for the oxidation of substances which are suspended or dissolved in a liquid resistant to oxidation.

In chemical reactions, there are often formed substances which are dissolved or suspended in a liquid and which are to be oxidized because, for example, they are waste products which must be removed. It is known to separate such suspended substances from the liquid by filtration and then oxidize them. This method is, however, very complicated. Difficulties arise especially in the oxidation of the separated moist substances, because the particulate solids are usually present as lumps with relatively large surface area and, during combustion of the same, uncontrollable high temperature peaks occur which strongly attack the combustion equipment, for example the grate of a boiler furnace. If the heat evolved is to be utilized, for example for steam generation, the uncontrollable heat of combustion which is occasionally evolved in the overheated regions makes regular operation impossible, especially when varying amounts of substance are to be oxidized.

It is known to treat sulfite waste liquors by evaporating and partly burning the liquors in an indirectly heated tube or in a combustion chamber, separating the residue from the vapor and burning it. This method has the disadvantage that the residue must be separated from the vapor in a special separation plant.

According to another known process, fuel and air are introduced tangentially into a combustion chamber, while the substances to be burned are injected centrally into the combustion chamber and atomized. This method is known for the oxidation of solid substances, but cannot readily be adapted for the treatment of substances which are suspended or dissolved in liquids.

It is an object of the present invention to provide a process for the complete combustion of combustible substances contained in a liquid in the presence of the vapor formed by evaporation of the liquid.

A further object of the invention is to provide a process for the evaporation of liquids containing combustible substances by direct treating by means of hot gases and for the subsequent combustion of the combustible substances.

Further objects and advantages of our invention will become apparent as the description proceeds.

The above objects are accomplished and the difficulties of the prior processes avoided by introducing the oxidation-resistant liquid which contains the substance to be oxidized into a rotation-symmetrical chamber, substantially evaporating the liquid, conveying the residual substances further in spiral paths by means of a gas stream, intimately mixing the said residual substances with oxygen-containing gas by means of a constriction of the gas stream, and substantially oxidizing them. Substances which can be oxidized with particular advantage by the process of our invention include carbon black, acetylene polymers, and polymers of other organic compounds. Liquids resistant to oxidation are, for example, water and sulfuric acid. The term "rotation-symmetrical chamber" as used herein includes, for example, cylindrical, oval and conical chambers.

It has proved successful to effect mixing of the gas stream and the oxygen-containing gas by means of an orifice plate, which subdivides the rotation-symmetrical chamber into two zones. In the first zone, mainly evaporation of the liquid takes place. Oxidation is effected only partly in the first zone, and is completed in the second zone.

The heat required to evaporate the oxidation-resistant liquid is advantageously produced by means of a burner, the flame of which is supplied with an excess of oxygen-containing gas.

The problem of oxidizing waste substances presents itself, for example, in the removal of by-products in acetylene production. In the thermal cracking of hydrocarbons, for example in the production of acetylene by partial oxidation of hydrocarbons, by cracking hydrocarbons in an electric arc or with the aid of solid or gaseous heat carriers, carbon black is formed which becomes suspended in the quenching water injected into the hot gases, in waste water from direct gas coolers and in the wash water from gas filters. The bulk of the carbon black is eliminated in conventional manner by allowing it to float to the surface and separating it in the form of a slurry which still contains a large percentage of water. Since such carbon-black slurries cannot be discharged into drains or allowed to soak away into the ground, attempts have been made to remove the carbon black by means of a rotary filter and to burn it in the grate of a steam boiler. This method is attended by the difficulties mentioned above.

In operation of the process according to this invention, it has been found that carbon black in aqueous suspension, which advantageously contains such an amount of water that the mixture is still pumpable, for example 80 to 99% by weight of water, can be burnt completely and without overheating by the method of our invention. When suitable conveying and metering equipment, for example a screw conveyor, is employed, it is also possible to introduce a carbon-black slurry containing less than 80% by weight of water into the first zone of the combustion chamber and burn it without overheating by the process according to this invention.

Because of the low concentration of carbon black and oxygen complete oxidation cannot, or only with great expenditure of heat, be accomplished in a chamber which is not subdivided by a constriction, for example by an orifice plate.

In the process according to the present invention, mixing of the substantially dried carbon black, which is conveyed in spiral paths in the vicinity of the wall of the combustion chamber, with free oxygen or air is effected by means of an orifice plate provided between the first and second zones of the chamber. The internal diameter of the orifice is less than that of the two zones of the rotation-symmetrical chamber. In the process according to this invention, either all of the fuel required for evaporating the liquid and of the necessary combustion air is introduced tangentially into a cylindrical antechamber which is provided at the entrance to the first zone and which has a smaller diameter than the first zone of the combustion chamber, or the bulk of the fuel and air is supplied tangentially into the antechamber and the remainder is introduced tangentially into the first zone of the combustion chamber.

The air or oxygen required for oxidation of the carbon black is introduced tangentially in the same direction of rotation either wholly into the antechamber or partly into the antechamber and partly into the first zone of the combustion chamber, so that the gases move through the chamber in a spiral course. The combustion gases envelop the carbon-black suspension, which is injected through an atomizer pipe, preferably centrally, into the first zone of the combustion chamber, and form a ring of flame whose diameter is approximately the same as the internal diameter of the said orifice. In this zone of high temperature, the wet carbon-black particles are substantially dried and move, through the rotating combustion gases containing excess oxygen, in spiral paths in the vicinity of the wall, where they are thrown by centrifugal force, toward the orifice at the end of the first zone of the combustion chamber.

The oxygen-containing combustion gases entrain the carbon-black across the upstream surface of the orifice plate to the edge of the orifice near the center of the chamber. There the two components mix, and then burn completely and uniformly in the second zone of the combustion chamber.

If necessary, additional fuel and air may be introduced at the periphery of the first zone in order to achieve complete combustion in the second zone.

Experiments have shown that it is sufficient to maintain a temperature of 500° to 650° C. in the vicinity of the wall of the first zone, i.e., a temperature slightly below the ignition point of the carbon black. In the second zone, a uniform temperature of about 900° to 1,000° C. is set up.

The heat contained in the gases and the heat of condensation of the water can be used in conventional manner for preheating the aqueous suspension or for heating the air or the fuel, so that the fuel requirements of the process can be kept at a minimum. This heat may also be employed for heating water or other media.

The heating of aqueous carbon-black suspensions and the evaporation of water from such suspensions by heating in contact with solid surfaces is attended by great difficulties because there is very rapidly formed on the side of the heating surface facing the suspension, a layer of dry, non-wettable carbon black which extremely impairs the transfer of heat into the suspension and renders it practically impossible to supply a sufficient quantity of heat to the suspension.

We have found that these difficulties are obviated and the heat of the off-gases is utilized in an especially advantageous manner by bringing the hot gases leaving the combustion chamber, if desired after passage through a heat exchanger, wholly or partly into direct contact with the oxidation-resistant liquid in which the substances to be oxidized are suspended or dissolved, for example in an immersion vessel. By this method, the suspension can be heated and concentrated in a simple manner. The suspension is maintained at a temperature above the dew point of the liquid vapors contained in the said hot gases. The off-gas introduced into the said liquid is cooled to this temperature. The heat thereby liberated is utilized for heating the contents of the immersion vessel and for evaporating the liquid from the suspension. In this manner, the water content of a carbon-black suspension can be reduced, for example, from 94% to 82%, i.e., about 71% of the water originally contained in the suspension can be evaporated. At a water content of 94%, the ratio of water:carbon black is 94:6. By reducing the water content to 82%, this ratio is changed to 82:18, or $$\frac{82}{3}:6$$

The amount of water corresponding to six parts of carbon black has thus been decreased from 94 to about 27.3. This is equivalent to a decrease in the amount of water by about 71%.

To recover the heat of evaporation, the uncondensed vapor may be liquefied in a condenser, where the vapors contained in the off-gases are likewise recovered by condensation. One or more of the media to be introduced into the combustion chamber may be used as cooling media, or water may be evaporated. Furthermore, an air or fuel preheater may be provided ahead of the direct heat exchanger.

It is expedient to concentrate the aqueous suspension only to such an extent that it is still pumpable and can be injected into the combustion chamber through an atomizer provided at the top thereof. When the suspension is highly concentrated, part or all of the air required for combustion may be used to convey the mixture of carbon black and water.

The process according to this invention permits simple regulation of the fuel supply, in that the additional supply of fuel required when the quantity or the water content of the suspension varies is controlled in dependence on the off-gas temperature or the temperature prevailing in one of the two zones of the combustion chamber. Automatic control of the process is thus rendered possible. It is advantageous to conduct the process according to this invention under increased pressure. This permits production of low-pressure steam by condensation of the steam contained in the off-gas.

In a similar manner, other types of impurities, such as organic matter, can be removed, for example from sulfuric acid or other liquids resistant to oxidation.

An embodiment of apparatus suitable for carrying out the process according to this invention is illustrated, in diagrammatic form and by way of example, in the accompanying drawing.

Into a vertical cylindrical chamber 1, which is subdivided into two zones 2 and 3 by an orifice plate 11 and provided with a superimposed smaller cylindrical antechamber 7, gaseous, liquid or solid fuels are supplied tangentially at 9 and gaseous oxidizing agents are introduced tangentially at 10 in such an amount that the fuel is burned completely and an excess of oxygen is present in the rotating hot combustion gas for oxidation of the substances to be oxidized. A suspension or solution of the substances to be oxidized is injected through an atomizer pipe 8 in the direction of the axis of the cylinder. The atomized particles are entrained by the rotating hot combustion gas, and the liquid contained in the particles is substantially evaporated. Deposit formation on the wall of the chamber is thus prevented. Partial oxidation takes place already during evaporation of the liquid. In the first zone 2, the partly oxidized substance contained in the suspension is thrown into the vicinity of the wall by centrifugal force and entrained downwardly by the hot gas in a spiral path to the orifice plate 11. When the tangential speed of the oxidizing agent is sufficiently high, combustion of the fuel takes place mainly in a ring of flame whose diameter is approximately the same as the internal diameter of the orifice plate 11. Excess oxidizing agent added in one or more separate planes, for example 15 or 16, rotates however mainly in the vicinity of the cylindrical wall and cools the same. At the inner edge of the orifice plate 11, the oxidizing agent streaming toward the center entrains the particulate solid into the center of the chamber and mixes with the same, mainly at the edge of the orifice plate. The particulate solid reacts with the oxidizing agent in the second zone 3, whose internal diameter is the same or, advantageously, smaller than that of the first zone 2. In the second zone, a high temperature occurs, which is uniformly distributed over the cross-section of the chamber. The chamber 1 discharges tangentially to a cylindrical afterburner 4 in which any incomplete oxidation is taken to completion. The suspension 17 is concentrated in an immersion vessel 5. The recovered liquid is withdrawn at 12 from a condenser 6. The condenser may be cooled with media which are used in the process according to the invention. A heat exchanger 13 is provided for preheating the combustion air and/or the fuel. The cold off-gases are withdrawn at 14.

The chamber 1 may also be arranged horizontally or in any other position instead of vertically. The vertical position is, however, especially advantageous.

Operation of the process according to this invention will be further illustrated by the following example, but it is to be understood that our invention is not limited thereto.

The numbers used in the example correspond with those in the accompanying drawing.

*Example*

Approx. 170 m.³ (S.T.P.)/hr. of coke-oven gas was introduced at 9, and approx. 1,300 m.³ (S.T.P.)/hr. of air at 10, into a cylindrical chamber 1 whose first zone 2 had a diameter of 680 mm. and a length of 1,800 m. 372 kg./hr. of wet carbon black with a water content of 84.7% was injected axially through an atomizer pipe 8 by means of 150 m.³ (S.T.P.)/hr. of air.

Halfway up the combustion chamber, a temperature of 630° C. was measured in the vicinity of the wall.

The carbon black rotating in the vicinity of the wall was mixed with unconsumed air at the edge of an orifice plate 11 of 350 mm. inside diameter, and burnt completely in the second zone 3 of the chamber 1, which had a length of 2,100 mm. and a diameter of 550 mm. A temperature of 960° C. was measured at the lower end of this zone.

The off-gas which had cooled to 610° C. and no longer contained any carbon black was passed to an immersion vessel 5, into which 945 kg. of wet carbon black with a water content of 94% (=57 kg. dry carbon black+888 kg. water) was introduced per hour.

573 kg./hr. of water was evaporated in the immersion vessel 5. This is 64.5% of the water contained in the wet carbon-black feed. The off-gas and the steam left the immersion vessel at 14 at a temperature of 82° C. 372 kg./hr. of concentrated carbon-black suspension with a water content of 84.7%, which also had a temperature of 82° C., was withdrawn from the immersion vessel and injected into the cylindrical chamber 1 as described above.

510 kg./hr. of an aqueous slurry containing 14.1% of dry carbon black and 2.7% of polymer of higher acetylenes was burned in a similar manner.

This application is a continuation of our application Serial No. 149,719 of November 2, 1961, now abandoned.

We claim:

1. A process for the complete combustion of solid waste substances said substances being selected from the group consisting of carbon black and organic polymers whereby entirely gaseous products are formed, which process comprises: passing said substances incorporated in an oxidation-resistant liquid axially into a first zone of a combustion chamber, tangentially introducing an oxygen-containing gas and fuel into an antechamber of said combustion chamber whereby a flame supporting gas stream is formed, said gas stream moving in a spiral path from said antechamber through the first zone of said combustion chamber in the vicinity of the wall of said combustion chamber, substantially evaporating said liquid in said chamber, mixing said waste substances and said gas stream at a substantial distance from the point of introduction of said waste substance and said gas stream into said chamber, and thereafter passing said intimately mixed substance and gas stream through an orifice into a second zone of said chamber wherein complete combustion of said waste substance takes place, the internal diameter of said orifice being substantially less than that of said first and said second zone of said chamber.

2. A process for the complete combustion of carbon black which comprises: passing said carbon black suspended in water axially into a first zone of a combustion chamber, tangentially introducing an oxygen-containing gas and a fuel into an antechamber of said combustion chamber whereby a flame supporting gas stream is formed, said gas stream moving in a spiral path from said antechamber through the first zone of said combustion chamber in the vicinity of the wall of said combustion chamber, substantially evaporating said water in said chamber, mixing said carbon black and said gas stream at a substantial distance from the point of introduction of said carbon black and said gas stream into said chamber, and thereafter passing said intimately mixed carbon black and gas stream through an orifice into a second zone of said chamber wherein complete combustion of said carbon black takes place, the internal diameter of said orifice being substantially less than that of said first and said second zone of said chamber.

3. A process for the complete combustion of acetylene polymer which comprises: passing said acetylene polymer suspended in water axially into a first zone of a combustion chamber, tangentially introducing an oxygen-containing gas and a fuel into an antechamber of said combustion chamber whereby a flame supporting gas stream is formed, said gas stream moving in a spiral path from said antechamber through the first zone of said combustion chamber in the vicinity of the wall of said combustion chamber, substantially evaporating said water in said chamber, mixing said acetylene polymer and said gas stream at a substantial distance from the point of introduction of said acetylene polymer and said gas stream into said chamber, and thereafter passing said intimately mixed acetylene polymer and gas stream through an orifice into a second zone of said chamber wherein complete combustion of said acetylene polymer takes place, the internal diameter of said orifice being substantially less than that of said first and said second zone of said chamber.

4. A process as claimed in claim 1 wherein the hot gases leaving the combustion chamber are brought into direct contact with the oxidation-resistant liquid in which the substances to be oxidixed are incorporated for the purpose of evaporating said liquid.

References Cited in the file of this patent

UNITED STATES PATENTS

| | | |
|---|---|---|
| 2,155,119 | Ebner | Apr. 18, 1939 |
| 2,368,827 | Hanson et al. | Feb. 6, 1945 |